July 1, 1930.  H. CUNNINGHAM ET AL  1,769,016
SAW GRINDING AND GUMMING CONTROL DEVICE
Filed Sept. 22, 1927
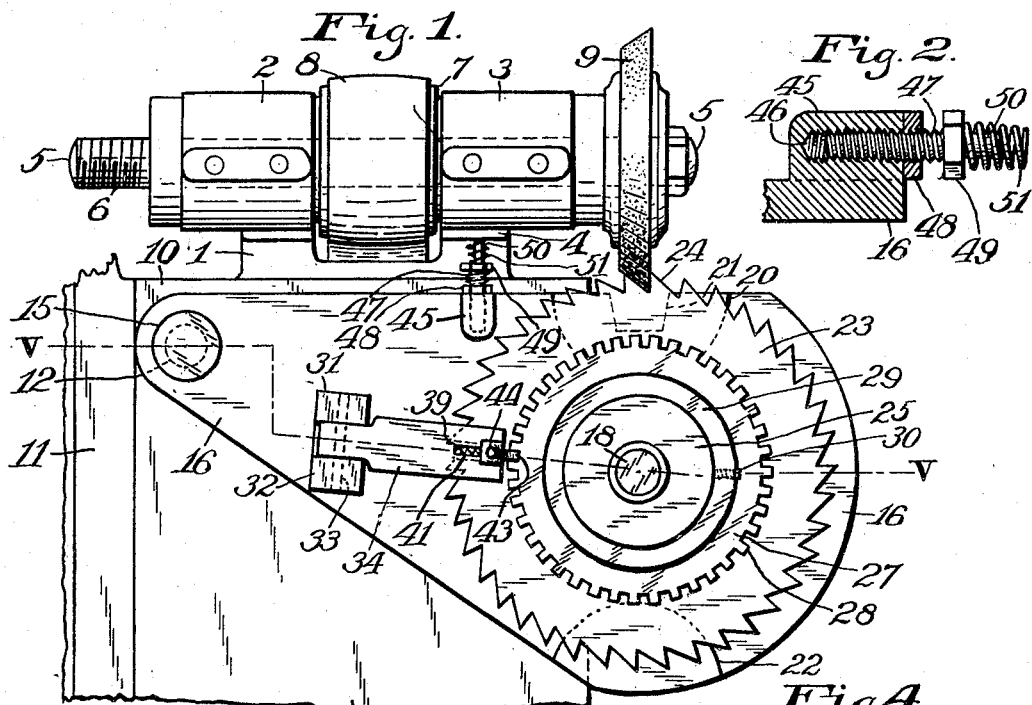
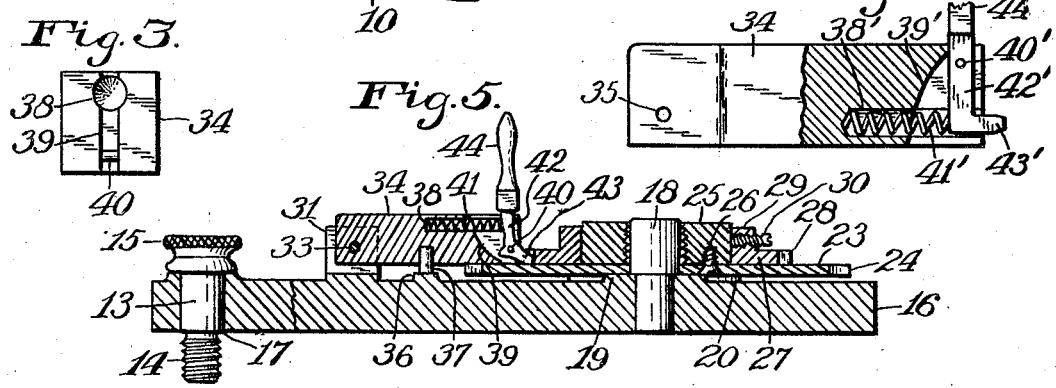
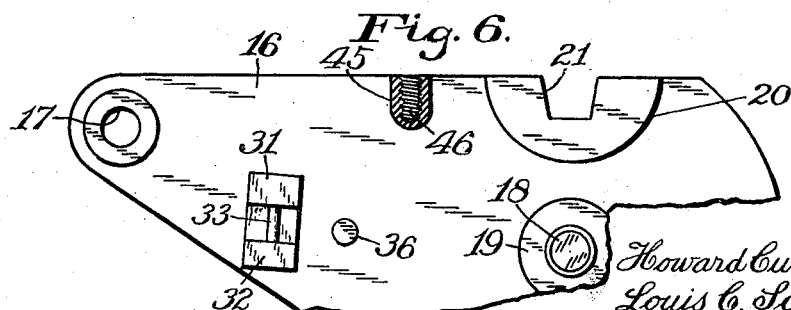
INVENTORS:
Howard Cunningham,
Louis C. Schwartz,
By E. T. Silvius,
ATTORNEY.

Patented July 1, 1930

1,769,016

UNITED STATES PATENT OFFICE

HOWARD CUNNINGHAM AND LOUIS C. SCHWARTZ, OF INDIANAPOLIS, INDIANA

SAW-GRINDING AND GUMMING-CONTROL DEVICE

Application filed September 22, 1927. Serial No. 221,282.

The invention relates to an apparatus for controlling saw-gumming and sharpening operations to insure uniformity of saw teeth, and especially to correctly grind and re-sharpen circular saw teeth which may have become faulty as the result of sharpening the teeth by the use of files, the invention having reference more particularly to means for guiding a circular saw to a grinding wheel under accurate control.

An object of the invention is to provide a device or appliance of improved construction whereby circular saws may be accurately controlled in sharpening operations to insure uniform spacing and length of teeth, so that the saw tooth points in operation shall follow a true circle, to enable them to cut easily and therefore require the minimum driving power.

Another object is to provide improved controlling apparatus for use in gumming and sharpening circular saws accurately, and which shall be so constructed as to be adapted to be readily applied to existing sawing machines and trimmers.

A further object is to provide an improved and efficient saw-gumming and sharpening control apparatus which shall be of such construction as to be adapted for application and use on machines commonly in use in printing shops and by stereotypers, whereby to cut and trim metallic printing plates and slugs and also brass rules, or wood bases, which controlling apparatus shall be of simple construction, not costly to manufacture, but durable and economical in use.

With the above-mentioned and other objects in view, the invention consists essentially in a novel toothed indicator plate adapted to be detachably secured to a saw hub, and a latch adapted to co-operate with the indicator plate, whereby to control saw-grinding operations so as to insure uniformity of saw teeth; and further, the invention consists in the parts and combinations and arrangements of parts as hereinafter particularly described and further defined in the accompanying claims.

Referring to the accompanying drawings,—Figure 1 is a top plan of the improved controlling apparatus assembled in connection with a portion of a well-known type of sawing and trimming machine; Fig. 2 is an enlarged sectional detail showing an improved stop device whereby to insure uniform depth of saw tooth and adapted to prevent over-heating and consequent injury to the saw teeth during grinding operations; Fig. 3 is an end view of an improved latch head embodied in the apparatus, on an enlarged scale; Fig. 4 is a side view of the latch head, partially in section, also on an enlarged scale, but slightly modified to accommodate a slightly modified arrangement of indicator latch; Fig. 5 is a section approximately on the line V—V on Fig. 1, showing the assembly of the apparatus ready for application to the sawing machine, and Fig. 6 is a top plan of the frame plate of the controlling apparatus, partially broken away.

Similar reference characters in the various figures of the drawings indicate corresponding elements or features of construction herein referred to in detail.

The type of sawing machine to which the invention is adapted to be removably applied comprises a standard 1 having two journal boxes 2 and 3 on its top, the standard having frame portions 4 protruding slightly from the side of the journal boxes, the boxes rotatably supporting a shaft or saw arbor 5 having a projecting screw-threaded portion 6 to which a circular saw or cutter may be secured; the shaft having a pulley 7 secured thereto between the journal boxes to be driven by a belt 8. For the purpose of grinding saws a suitable grinding wheel 9 is secured to the shaft 5 adjacent to one end thereof, the opposite end of the shaft usually carrying and operating the saw. A suitable table 10, which may vary on different machines is supported by the stand 1 and has a guide 11 on one side thereof for guiding work to be operated on by the saw; and usually the table has a screw hole 12 located in proximity to the guide 11 and that portion of the table that is only a short distance from the journal box 2, for use in connecting various devices to the table and is convenient for the present invention, but when absent the machine table is to be provided with such a screw-threaded hole to support a pivot pin 13 having a screw-threaded portion 14 adapted to be screwed into the hole, the pin having a knurled head 15.

An essential part of the invention comprises a guiding frame plate 16 adapted to be supported and to slide upon the table 10, the plate having a pivot hole 17 adjacent to one end thereof to receive the pivot pin 13. The plate is provided with an axle stud 18 at a suitable distance from the pivotal point of the plate, so as to be approximately opposite to the face of the grinding wheel 9, the plate preferably having a boss 19 extending about the stud, and also a boss 20 adjacent to one edge thereof which is normally in proximity to the grinding wheel, the edge of the plate having a notch 21 to clear the grinding wheel. The opposite portion of the frame plate preferably has a boss 22 thereon, said bosses being adapted for firmly supporting a saw requiring sharpening. As an example of the function of the control apparatus a circular saw 23 having cutting teeth 24 is illustrated, being adapted for cutting type-metal. The saw has a central hub 25 secured to one side thereof by suitable devices which may be screws 26, the hub being adapted to suitably secure the saw to the arbor portion 6 and to center the saw rotatably on the stud 18. Practically the saws are usually approximately five or six inches in diameter, some having more teeth than others.

In accordance with the invention a suitable number of indicator plates are provided, each designed to be used in connection with the saw having a certain number of teeth, each indicator comprising a ring 27 having teeth 28 of spur-tooth form on its periphery equally spaced apart so that broad bottom notches are provided to receive and retain a latch. The number of notches equal the number of teeth on the saw to which the indicator plate is to be applied, the ring having an annular hub member 29 integrally fixed on one side thereof that is provided with a set-screw 30 for adjustably securing the ring in place when slipped onto the saw hub 25.

The top of the frame plate 16 has a pivot ear or preferably two ears 31 and 32 fixed thereon and preferably located approximately between the pivot hole 17 and the stud 18, and a pivot pin 33 is secured to the ears. A latch head 34 is provided which has one end portion closely fitted between the ears and connected to the pivot pin 33, the head having a pivot hole 35 to receive the pin, the head being arranged to normally extend towards the stud 18 and may rest upon a saw when present with its end adjacent to the periphery of the indicator plate, and the latch head may be provided with a stop comprising a boss 36 cast upon the plate 16, and if desired a pin 37 secured to the head to engage the boss. The latch head has a guide bore 38 therein which preferably is in the upper portion of the head, and a slot 39 is cut vertically in the end of the head, a pivot pin 40 being arranged in the lower portion of the slot. A coil spring 41 is arranged in the guide bore and under compression against a small lever 42 that is arranged in the slot and connected to the pivot 40, the lever having an index finger 43 adapted to closely fit into a notch between two teeth 28 of the indicator plate, the lever having a handle 44 thereon whereby to tilt the lever to swing the finger out of the notch. Permissibly the index finger may be fixed to the latch head and the spring omitted.

On a portion of the plate 16 that is normally nearer to the frame portion 4 a stop device is mounted, preferably having a boss or boxing 45 cast upon the frame plate and having a screw-threaded hole 46 therein in which an adjusting screw 47 is screwed and provided with a lock nut 48 to engage the face of the box, the screw being adapted to be carried into contact with the frame portion 4 of the sawing machine, and preferably has a collar 49 thereon and a guide stem 50 projecting from the collar and on which a coil spring 51 is arranged, the spring being longer than the stem so as to first come in contact with the frame portion 4 to gradually check the frame plate 16 when swung towards the grinding wheel, whereby to prevent the saw from being harshly thrust against the grinding wheel with possible injury to the wheel or to the saw teeth. The collar 49 is adapted to be engaged by a wrench for turning the screw.

In the modified form shown in Fig. 4 a latch head has a guide bore 38' arranged in the lower portion of the head, a slot 39' and a pivot 40' arranged in the slot adjacent to the top of the head, a spring 41' being arranged in the guide bore, and a lever 42' connected to the pivot and having an index or latch finger 43' to be moved radially into notches in the indicator plate.

It will be understood that a grinding wheel is to be selected and used that will be suitable for grinding and sharpening such teeth as a particular saw may have, in the present case the grinding wheel having a beveled face and being suitable for sharpening metal saw teeth, as shown for illustration.

In practical use, the frame plate 16 having been placed flat-wise upon the table 10 of a sawing or trimming machine and connected to the table by the pivot screw 13, the frame plate may be swung toward or from the grinding wheel. A circular saw is placed upon the stud 18 after the latch head 34 has been swung back on its pivot, the indicator plate is placed on the saw hub and ready to be secured thereto, after which the saw is brought to the grinding wheel and adjusted thereto, after which the head 34 is swung down to operative position and the index finger entered into one of the notches in the indicator plate, the latter being then secured to the saw hub by tightening the set-screw 30. The machine may be started after slightly drawing the saw back from the grinding wheel or permitting the spring 51 to push the frame plate back, after which the workman may use his hands to manipulate the frame plate 16 to bring the saw teeth successively to the grinding wheel, the movement to be accurately stopped by the stop screw 47 so that the faces and the backs of the saw teeth become accurately ground and of uniform depth, or essentially uniform length of the cutting teeth. After each tooth is ground the latch device is withdrawn from a notch and entered into the next adjacent notch successively until all the saw teeth have been sharpened, the result being a truly circular saw.

What is claimed is:

1. In a saw-grinding and gumming control device, the combination of a broad flat bottom frame plate having pivot ears fixed thereon and also an axle stud fixed thereon distant from the ears, a notched indicator ring to be rotatively guided on the axle stud with an intervening saw hub, a latch head pivoted to said ears and having a coil spring seated therein, and a lever pivoted to said head in contact with the spring and having a projecting finger to be entered separately into the ring notches.

2. In a saw-grinding and gumming control device, the combination with a sawing machine frame having a flat top table, and a grinding wheel mounted on the frame, of a frame plate having a plane bottom slidably supported directly upon said table and removably pivoted thereto distant from said wheel, an axle stud fixed upon the top of said plate opposite to said wheel and on the plane of rotation of the wheel, an adjustable stop device mounted upon said plate opposite to a part of said frame and in proximity to said wheel, a notched indicator ring having a hub to be adjustably secured to a saw hub and rotatably guided thereby on said stud, and a latch device mounted upon said plate and movable in a direction to engage and hold said ring relatively to said plate.

3. An improved saw-grinding and gumming control device comprising a flat frame plate having a plane under side adapted to be movably supported directly upon a sawing machine table, said plate having a relatively narrow end portion provided with a pivot hole and having also an axle stud fixed thereon distant from said hole to rotatably guide a saw hub, an annular notched indicator having a hub to be removably slipped over the saw hub and being provided in one side with a set-screw to adjustably secure the said hubs together, two ears fixed upon said plate in proximity to said hole, a latch head pivoted at one end to said ears and normally extending towards said stud, the opposite end of said head having an index finger projecting therefrom to engage and hold said indicator, a stop device adjustably supported by said plate at one edge thereof distant from said hole, and a pivot pin insertable into said hole and to be secured to said table.

In testimony whereof, we affix our signatures on the 17th day of September, 1927.

HOWARD CUNNINGHAM.
LOUIS C. SCHWARTZ.